W. MANN.
MOVABLE BINDER.
No. 1,673. Patented July 3, 1840.
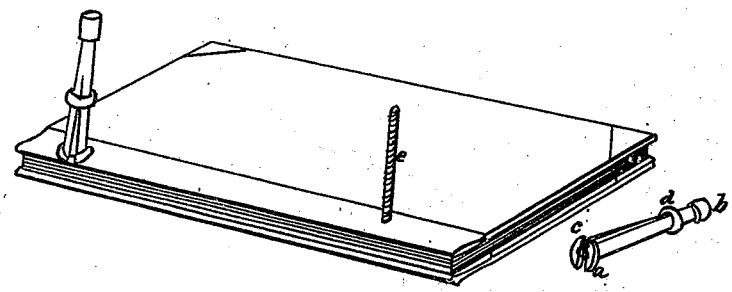

UNITED STATES PATENT OFFICE.

WM. MANN, OF PHILADELPHIA, PENNSYLVANIA.

CONSTRUCTION OF SCREW-NUTS TO BE APPLIED TO FILES FOR FILING PAPERS, ACCOUNTS, &c.

Specification of Letters Patent No. 1,673, dated July 3, 1840.

*To all whom it may concern:*

Be it known that I, WILLIAM MANN, of Philadelphia city, in the State of Pennsylvania, have invented a new Improvement in Files for Filing Letters and other Papers, of which the following is a full and exact description.

The nature of my improvement consists in the peculiar structure of the divided spring screw nuts, which I use on the wire that is thrust through the back or margin of the papers, to compress them between the leaves of the file.

The annexed drawing constitutes a part of this description, and represents a file with papers inserted between the leaves. At the back edge of each of the leaves is inserted a small flat metallic rod, from one of which projects two pointed wires, one of which is seen at $e$. They may be of any convenient length, say about two inches. These wires after being thrust through the margin of the papers to be filed, pass through corresponding apertures in the flat rod of the opposite leaf. A screw thread being cut in these wires, the spring screw nut is applied to produce the necessary compression. Inasmuch as these nuts must be taken off and put on again every time a paper is added to the file, much time is saved by a contrivance by means of which it may be slipped off and on again to its bearing, before it is made to take the thread of the screw. This is accomplished by the nut or female screw being divided so as to open and be relieved from its embrace of the screw until the force of the screw is wanted to compress the papers in the file.

$a\ b$ is a drawing of the spring screw nut.

$a$ and $c$ are the two halves of the nut, it being divided through the center.

$a\ b$ and $c\ d$ are springs attached to either half of the nut, and united at $b$.

$d$ is a sliding ring which, being moved toward $a\ c$, closes the nut upon the wire of the file. When the nuts are to be removed for the purpose of placing papers on file, the ring is slipped toward $b$ when they open by the force of the springs and are relieved from their embrace of the wires. The springs are concave on the inner side, so that when brought near together they form a tube to admit the wire $e$.

Now what I claim as my invention or improvement is—

The construction of the divided spring screw nut, opening by the elasticity of the springs attached to the two halves of the nut, and united at $b$, and made to close by means of the sliding ring, and adapted, in the manner above described, to the file for filing letters and other papers.

WILLIAM MANN.

Witnesses:
    C. H. WILIBERGER,
    JNO. RUGGLES.